(12) United States Patent
Bachmann

(10) Patent No.: US 11,667,256 B2
(45) Date of Patent: Jun. 6, 2023

(54) AIRBAG MODULE FOR A VEHICLE STEERING WHEEL

(71) Applicant: ZF AUTOMOTIVE SAFETY GERMANY GMBH, Aschaffenburg (DE)

(72) Inventor: Stefan Bachmann, Heimbuchenthal (DE)

(73) Assignee: ZF AUTOMOTIVE SAFETY GERMANY GMBH, Aschaffenburg (DE)

( * ) Notice: Subject to any disclaimer, the term of this patent is extended or adjusted under 35 U.S.C. 154(b) by 61 days.

(21) Appl. No.: 16/639,792

(22) PCT Filed: Aug. 3, 2018

(86) PCT No.: PCT/EP2018/071154
§ 371 (c)(1),
(2) Date: Feb. 18, 2020

(87) PCT Pub. No.: WO2019/038065
PCT Pub. Date: Feb. 28, 2019

(65) Prior Publication Data
US 2021/0122320 A1 Apr. 29, 2021

(30) Foreign Application Priority Data
Aug. 24, 2017 (DE) .................. 10 2017 119 335.9

(51) Int. Cl.
*B60R 21/203* (2006.01)
*B60R 21/217* (2011.01)

(52) U.S. Cl.
CPC .. *B60R 21/2037* (2013.01); *B60R 2021/2175* (2013.01)

(58) Field of Classification Search
CPC .............. B60R 21/203; B60R 21/2037; B60R 2021/2173; B60R 2021/2175
See application file for complete search history.

(56) References Cited

U.S. PATENT DOCUMENTS 6,592,141 B1 7/2003 Dancasius et al.
10,272,871 B2 * 4/2019 Kienzner .............. B60R 21/217
(Continued)

FOREIGN PATENT DOCUMENTS

DE 102009006077 7/2010
EP 1718503 12/2009

OTHER PUBLICATIONS

Espacenet machine translation of DE 102009006077 A1. [Retrieved from Internet Mar. 14, 2022]. (Year: 2022).*

*Primary Examiner* — Barry Gooden, Jr.
(74) *Attorney, Agent, or Firm* — Tarolli, Sundheim, Covell & Tummino LLP

(57) ABSTRACT

The invention relates to an airbag module (10) for a vehicle steering wheel (6), comprising a module base (12) for fixed mounting on the vehicle steering wheel (6), which module base has a base opening (14), and a vibration absorber ring (16) for fastening a gas generator (18) to the module base (12) such that said gas generator can vibrate. The vibration absorber ring (16) has a ring axis (A) and a mounting flange (20) for the gas generator (18). The vibration absorber ring (16) has a resilient absorber wall (22), starting from the mounting flange (20), which absorber wall extends in an axial direction toward the module base (12) and extends around the ring axis (A) in the circumferential direction. The vibration absorber ring (16) has a plurality of resilient absorber feet (24) for fastening to the module base (12), which absorber feet extend in the axial direction. The vibration absorber ring (16) is fastened to the module base (12) by means of the absorber feet (24) such that the (Continued)

absorber wall (22) bears against the module base (12) already before activation of the airbag module (10) and acts in an axial direction against the module base (12) and is resiliently deformed.

19 Claims, 5 Drawing Sheets

(56) References Cited

U.S. PATENT DOCUMENTS

| | | | |
|---|---|---|---|
| 10,369,954 B2* | 8/2019 | Eck | B60R 21/26 |
| 10,513,238 B2* | 12/2019 | Von Roden | B60R 21/261 |
| 2001/0048216 A1* | 12/2001 | Varcus | B60R 21/2037 |
| | | | 280/728.2 |
| 2002/0117836 A1* | 8/2002 | Asic | B60R 21/2037 |
| | | | 280/728.2 |
| 2002/0153708 A1* | 10/2002 | Kreuzer | B60R 21/2037 |
| | | | 280/728.2 |
| 2002/0153714 A1* | 10/2002 | Kreuzer | B60Q 5/003 |
| | | | 280/731 |
| 2006/0061068 A1* | 3/2006 | Nash | B60R 21/2037 |
| | | | 280/728.2 |
| 2006/0197323 A1* | 9/2006 | Pillsbury | B60Q 5/003 |
| | | | 280/731 |
| 2011/0233905 A1* | 9/2011 | Marotzke | B60Q 5/003 |
| | | | 280/731 |
| 2012/0139212 A1* | 6/2012 | Staudt | B60R 21/2037 |
| | | | 280/728.2 |
| 2014/0145420 A1* | 5/2014 | Amamori | B60Q 5/003 |
| | | | 280/731 |
| 2014/0203539 A1* | 7/2014 | Bachmann | B62D 1/046 |
| | | | 280/728.1 |
| 2014/0306432 A1* | 10/2014 | Obayashi | B62D 1/10 |
| | | | 280/728.2 |
| 2017/0313275 A1* | 11/2017 | Eck | B60R 21/272 |
| 2017/0369021 A1* | 12/2017 | Kienzner | B60R 21/217 |
| 2018/0312128 A1* | 11/2018 | Von Roden | B60R 21/272 |
| 2019/0143927 A1* | 5/2019 | Casal Alonso | B60R 21/2037 |
| | | | 280/731 |
| 2020/0189658 A1* | 6/2020 | Bachmann | B60R 21/2035 |
| 2020/0339192 A1* | 10/2020 | Myklebust | B60Q 5/003 |

* cited by examiner

AIRBAG MODULE FOR A VEHICLE STEERING WHEEL

RELATED APPLICATIONS

This application corresponds to PCT/EP2018/071154, filed Aug. 3, 2018, which claims the benefit of German Application No. 10 2017 119 335.9, filed Aug. 24, 2017, the subject matter of which are incorporated herein by reference in their entirety.

BACKGROUND OF THE INVENTION

The invention relates to an airbag module for a vehicle steering wheel, comprising a module base for fixed mounting on the vehicle steering wheel which module base has a base opening, and comprising a vibration absorber ring for fastening a gas generator to the module base so that the gas generator can vibrate, wherein the vibration absorber ring has a ring axis and a mounting flange for the gas generator, the vibration absorber ring having a resilient absorber wall, starting from the mounting flange, which absorber wall extends in an axial direction toward the module base and extends around the ring axis, and wherein the vibration absorber ring has a plurality of resilient absorber feet for fastening to the module base which absorber feet extend in the axial direction.

In numerous vehicle steering wheels, vibrations which the driver perceives as disturbing occur during idling or within particular speed ranges of the vehicle. Said vibrations are due, inter alia, to the rigid coupling of the vehicle steering wheel to the steering column.

It is known to make use of vibration absorbers, as they are called, for avoiding the undesired steering wheel vibrations so as to adapt the natural frequency of the overall system such that it is within an uncritical range. At present, the gas generator of an airbag module disposed in the steering wheel is used as counter-vibrating absorber mass, for example.

The generic EP 2 445 761 B1 already illustrates an airbag module in which the gas generator is mounted on a generator carrier via resilient mounting feet of a vibration absorber ring such that the gas generator can vibrate. After triggering the gas generator, the pressure increases in an airbag, thus causing the gas generator to be loaded in the direction of the generator carrier. As soon as a sufficient internal pressure is reached, the gas generator and the vibration absorber ring move toward the generator carrier while deforming the mounting feet so as to effectuate a sealing between the gas generator and the generator carrier, i.e. to close a gap between the gas generator and the generator carrier.

However, it has turned out that, until the sealing is provided between the gas generator and the generator carrier, an undesirably large gas volume escapes from the airbag module. Said loss of gas may be compensated by additional propellant, to be sure, this will result in larger gas generators and additional costs, however. Furthermore, the airbag also has a shorter service life, as the gap opens again after deployment of the airbag, when the internal pressure is reduced, thus causing pressure drop to be accelerated.

SUMMARY OF THE INVENTION

It is the object of the invention to provide an airbag module comprising a gas generator which is supported such that it can vibrate, which airbag module shows minimum losses of gas upon activation of the gas generator.

In accordance with the invention, this object is achieved by an airbag module of the type mentioned in the beginning in which the vibration absorber ring is mounted on the module base by means of the absorber feet such that, already before activation of the airbag module, the absorber wall bears against the module base and acts in an axial direction against the module base and is resiliently deformed. Due to said permanent bias of the absorber wall, no axial gap through which generator gas might escape to the outside of the airbag module via the base opening in any undesired manner is formed between the vibration absorber ring and the module base. In the circumferential direction, the absorber wall is preferably designed to be closed in ring shape and encloses the base opening of the module base so that no tangential gap is provided, either, via which generator gas might escape. The sealing between the vibration absorber ring and the module base is thus significantly improved especially at the beginning of the airbag deployment and undesired gas leakage is appropriately minimized. Since, before triggering of the gas generator, the vibration absorber ring and the module base are no longer permanently coupled exclusively via the absorber feet but also via the absorber wall, the absorber wall must also be taken into account as an absorber spring when adapting the absorber system. For example, via the bias, the wall thickness and the selection of the material used for the absorber wall and the resilience resulting therefrom, a vibration frequency to be eliminated can be adjusted with little effort.

The absorber feet preferably form a detent or snap-on connection with the module base. In this way, the vibration absorber ring can be mounted quickly and easily on the module base without the use of specific tools.

According to one embodiment of the airbag module, each of the absorber feet includes a mounting portion having a thickened outer cross-section and a peripheral absorber foot groove, with fastening openings being provided in the module base and an edge of each fastening opening engaging in the absorber foot groove of an associated absorber foot. In this way, the absorber feet can be inserted into the fastening openings until a respective opening edge snaps into the associated absorber foot groove while the thickened outer cross-section is resiliently deformed and the vibration absorber ring is mounted on the module base with little effort.

The resilient absorber wall preferably has a free axial wall end adjacent to the module base, wherein a radial stop is formed in the module base to be radially adjacent to the free axial wall end. After triggering the gas generator, the pressure inside the airbag will increase and acts on the free axial wall end in the radial direction against the radial stop of the module base. Especially preferred, a closed ring contact is formed which prevents the resilient absorber wall from being excessively deformed and, moreover, ensures extremely reliable, ideally largely leakage-free sealing between the absorber wall and the module base.

Of particular preference, the absorber wall includes a free axial wall end adjacent to the module base, wherein a groove in which the free axial wall end engages is formed in the module base.

According to one embodiment of the airbag module, the absorber feet are integrated in one piece in the peripheral absorber wall, especially wherein the absorber feet have a larger dimension than the absorber wall in the axial and radial directions. Alternatively, it is also imaginable that the absorber feet are arranged to be radially offset against the peripheral absorber wall.

Preferably, the plurality of absorber feet is arranged to be evenly spread in the circumferential direction, especially wherein the vibration absorber ring includes three absorber feet. As a matter of course, also vibration absorber rings having a different number of absorber feet, especially having four absorber feet, are imaginable.

The resilient absorber feet at least in portions have a hollow cross-section in the axial direction according to one embodiment of the airbag module. Said hollow cross-section results in an especially low vibration resistance of the absorber feet. This is advantageous as, apart from the vibration resistance of the absorber feet, also a vibration resistance of the resilient absorber wall must be taken into account and a resulting overall vibration resistance must not become too high so as to achieve vibration absorption within a desired frequency range.

Preferably, the vibration absorber ring is a two-component part having a resilient first component that forms the absorber wall and the absorber feet and a largely dimensionally stable second component that has lower resilience than the first component. Of preference, the first component is a resilient plastic material, especially an elastomer such as rubber or silicone, whereas the second component preferably is a comparatively rigid plastic material, especially a thermoplastic, or a metal such as e.g. steel. For reasons of manufacture and cost, the vibration absorber ring preferably is a two-component injection-molded part made from two plastic components.

According to another embodiment of the airbag module, a gas generator is provided comprising a generator flange which bears against the mounting flange of the vibration absorber ring in the axial direction and is preferably peripherally closed in the circumferential direction, especially wherein the gas generator is fixedly connected, for example locked, crimped, pressed or screwed, to the vibration absorber ring. Especially preferred, both flanges are peripherally closed and are fully bearing against each other so that a substantially tight connection is formed.

BRIEF DESCRIPTION OF THE DRAWINGS

Further features and advantages of the invention will be evident from the following description of a preferred embodiment with reference to the drawings, wherein.

DESCRIPTION

Figure 1:
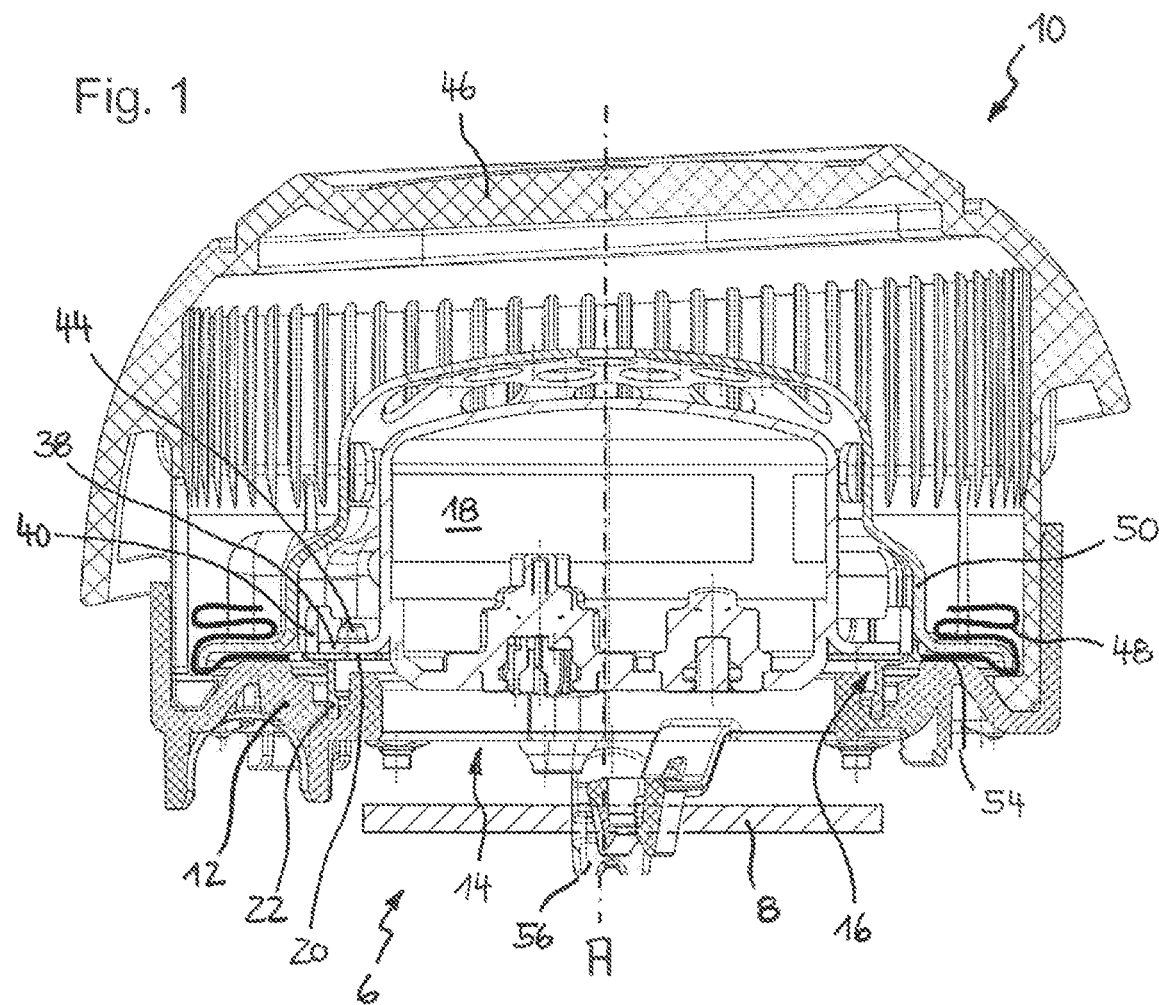
FIG. 1 shows a section across a vehicle steering wheel comprising an airbag module according to the invention.

FIG. 1 illustrates an airbag module 10 for a vehicle steering wheel 6, comprising a module base 12 which is fixedly mounted on a schematically indicated steering wheel armature 8 of the vehicle steering wheel 6 and has a base opening 14, and comprising a vibration absorber ring 16 for mounting a gas generator 18 on the module base 12 such that the gas generator can vibrate. The module base 12 in the present example embodiment is a generator carrier, wherein the gas generator 18 extends at least partially through the base opening 14 and/or can be connected to an electric control unit via the base opening 14.

Figure 2:
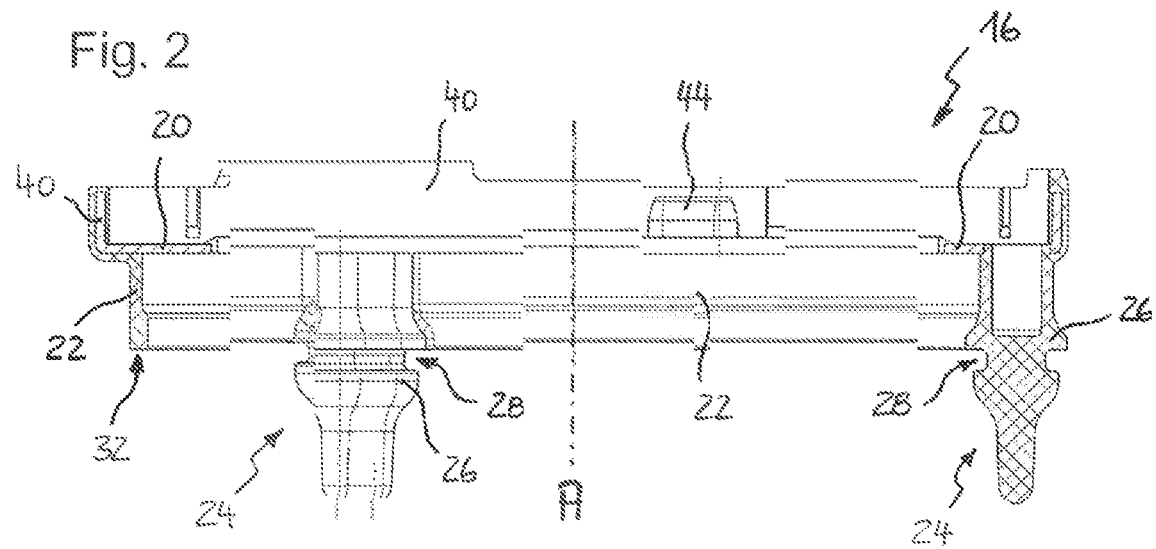
FIG. 2 shows a section across a vibration absorber ring of the airbag module according to FIG. 1.

The vibration absorber ring 16 detailed in FIG. 2 comprises a ring axis A and a mounting flange 20 for the gas generator 18 peripherally closed in the circumferential direction, the vibration absorber ring 16 having a resilient absorber wall 22, starting from the mounting flange 20, which absorber wall extends in an axial direction toward the module base 12 and extends around the ring axis A being closed in a circumferential direction.

Figure 3:
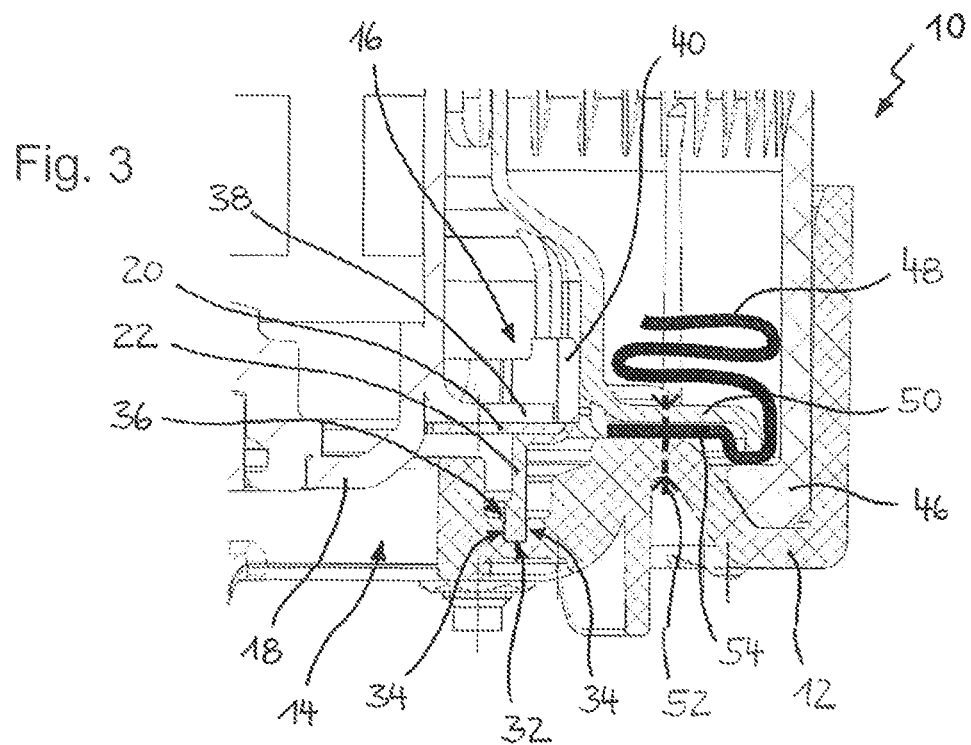
FIG. 3 shows a detailed section across the airbag module according to FIG. 1 in the area of a resilient absorber wall of the vibration absorber ring.
Figure 4:
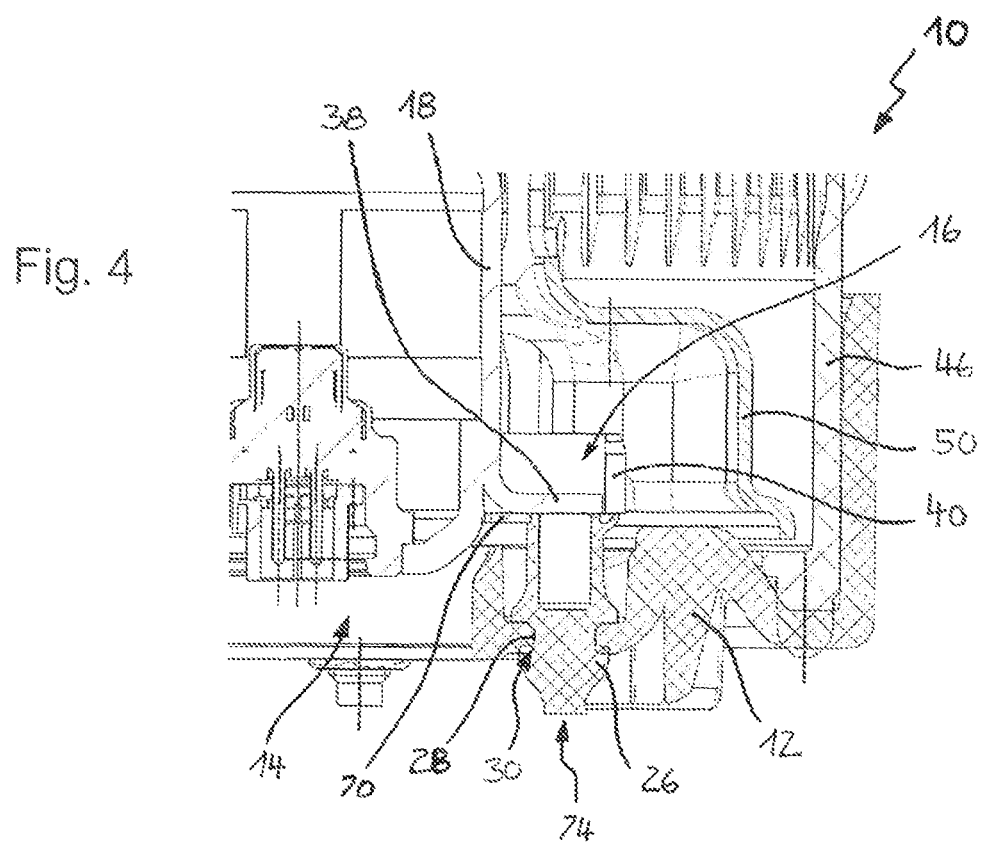
FIG. 4 shows a detailed section across the airbag module according to FIG. 1 in the area of a resilient absorber foot of the vibration absorber ring.

Furthermore, for fastening to the module base 12 the vibration absorber ring 16 has a plurality of resilient absorber feet 24 which extend in an axial direction, wherein the vibration absorber ring 16 is fastened to the module base 12 by means of the absorber feet 24 such that the absorber wall 22 bears against the module base 12 already before activation of the gas generator 18 and acts in an axial direction against the module base 12 and is resiliently deformed (cf. also FIGS. 3 and 4). Due to said permanent axial bias of the absorber wall 22 against the module base 12 in the form of a generator carrier, a substantially tight connection is formed which largely prevents gas from leaking to the outside of the airbag module 10 already immediately after triggering of the gas generator 18.

By way of FIG. 4, it becomes clear that the absorber feet 24 form a detent or snap-on connection with the module base 12 for easily and quickly mounting the vibration absorber ring 16 on the module base.

Concretely speaking, each of the absorber feet 24 includes a mounting portion 26 having a thickened outer cross-section and a peripheral absorber foot groove 28, with fastening openings 30 being provided in the module base 12 and an edge of each fastening opening 30 engaging in the absorber foot groove 28 of an associated absorber foot 24.

According to FIG. 3, the absorber wall 22 has a free axial wall end 32 axially adjacent to the module base 12, wherein in the module base 12 a radial stop 34 is formed to be radially adjacent to the free axial wall end 32. Said radial stop 34 arranged especially radially inwardly of the absorber wall 22 helps to press the free wall end 32 against the radial stop 34 when it is pressurized with generator gas. The free wall end 32 therefore cannot deform radially inwardly and, consequently, cannot release any gas flow via the base opening 14 to the outside of the airbag module 10. Especially preferred, both the absorber wall 22 and the radial stop 34 are formed to be peripheral in the circumferential direction so that therebetween a closed ring contact is formed which has an increasing tightness with an increasing gas pressure.

In the shown example embodiment of the airbag module 10, in the module base 12 a radial stop 34 is provided both radially inwardly of the absorber wall 22 and radially outwardly of the absorber wall 22, the two radial stops 34 defining a groove 36. In other words, according to FIG. 8, a groove 36 in which the free axial wall end 32 of the absorber wall 22 engages is formed in the module base 12. The free wall end 32 is fixed, especially fixed largely free from play, by said groove 36 in both radial directions.

As the absorber wall 22 is in permanent contact with the module base 12 fixedly mountable on the steering wheel armature 8, also the absorber wall 22 generates a resistance in absorbing vibrations. Therefore, it is advantageous on the other hand to reduce the vibration resistance of the absorber feet 24 to prevent excessive total vibration resistance, i.e. an excessive rigidity of the absorber system on the whole.

Figure 5:
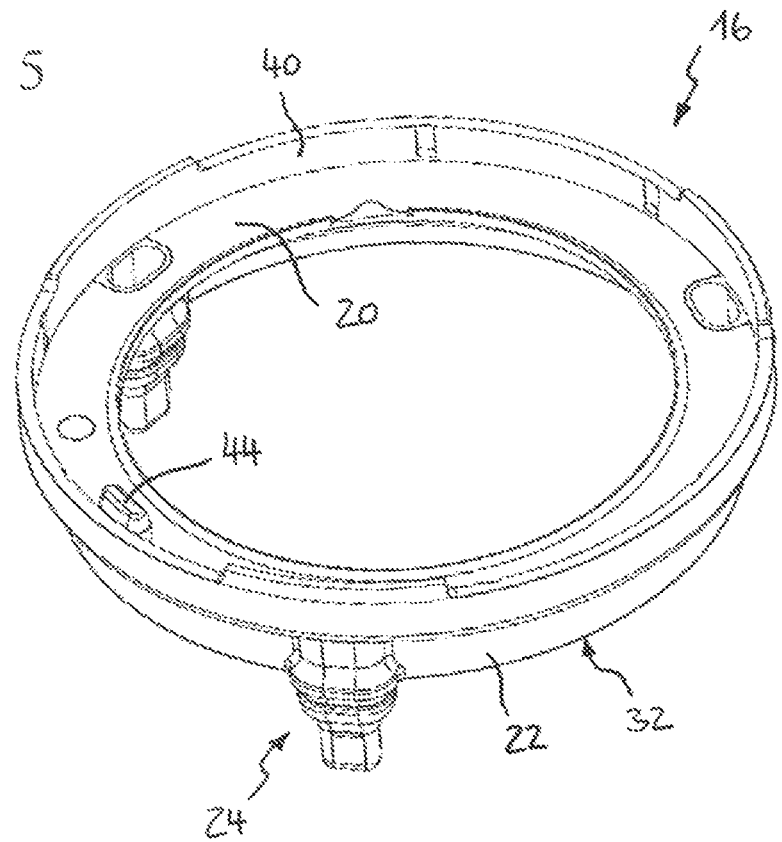
FIG. 5 shows a perspective top view of the vibration absorber ring according to FIG. 2.

As indicated in FIGS. 2, 4 and 5, the resilient absorber feet 24 at least in portions have a hollow cross-section in an axial direction, for example, to reduce the vibration resistance.

For the rest, the vibration absorber ring 16 in the illustrated example embodiment is a two-component part, comprising a resilient first component forming the absorber wall 22 and the absorber feet 24, and comprising a largely dimensionally stable second component being less resilient than the first component. In this way, a desired rigidity of the absorber system can be influenced also by the material of the first component without simultaneously requirements to stability of the vibration absorber ring 16 having to be met. The required stability, especially of the mounting flange 20 of the vibration absorber ring 16, is ensured via appropriate selection of the material of the second component. The first component preferably is a resilient plastic material, especially an elastomer such as rubber or silicone, whereas the second component preferably is a comparatively tight and rigid plastic material, especially a thermoplastic, or a metal such as e.g. steel. For reasons of manufacture and cost, the vibration absorber ring 16 is especially preferred to be a two-component injection-molded part made from two plastic components different from each other.

Figure 6:
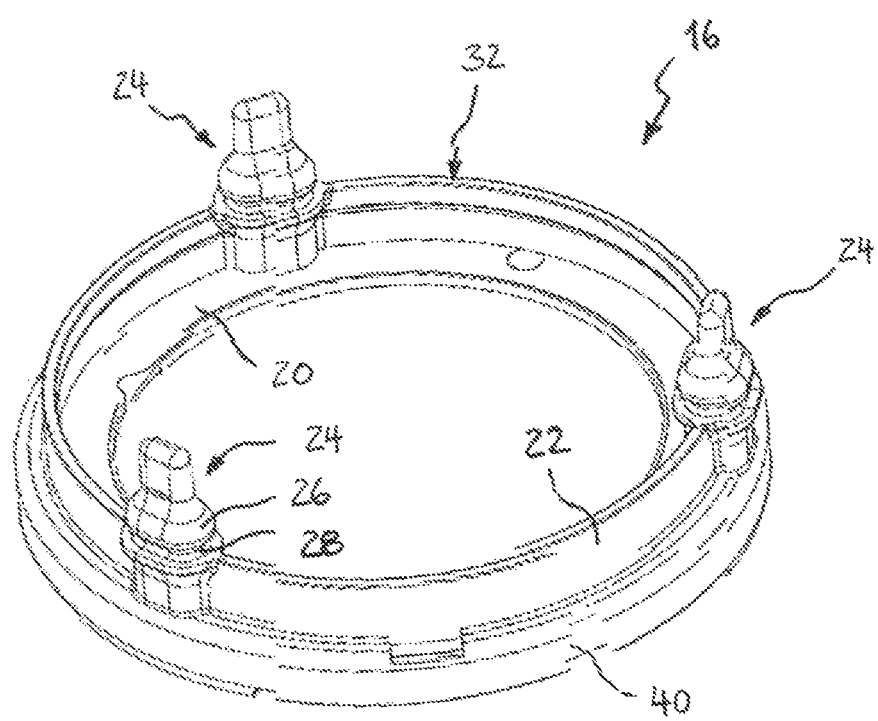
FIG. 6 shows a perspective bottom view of the vibration absorber ring according to FIG. 2.

In the configuration variant of the vibration absorber ring 16 according to FIG. 6, the absorber feet 24 are integrated in the peripheral absorber wall 22 in one piece. Accordingly, the absorber feet 24 have a larger dimension in the axial and radial directions than the absorber wall 22. However, it is also imaginable as an alternative that the absorber feet 24 are arranged to be radially offset against a closed peripheral absorber wall 22.

Figure 7:
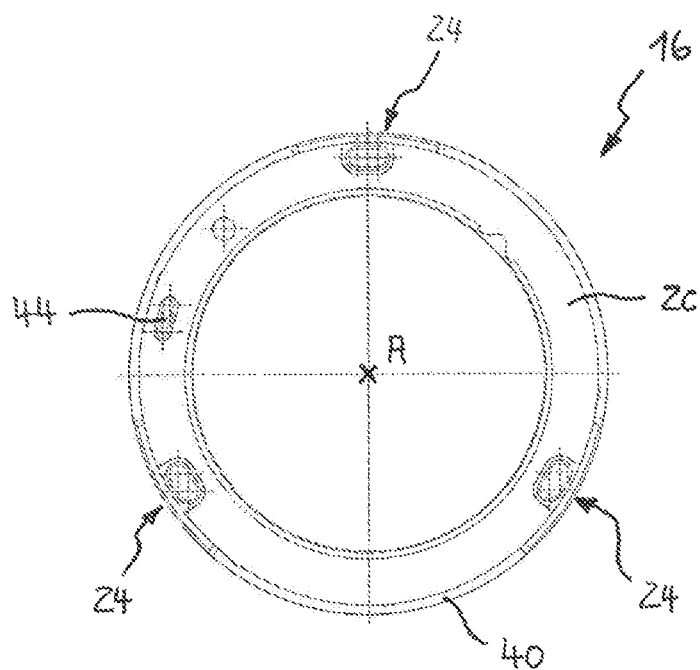
FIG. 7 shows an axial top view of the vibration absorber ring according to FIG. 2.

The top view of the vibration absorber ring 16 according to FIG. 7 illustrates that the plurality of absorber feet 24 are arranged to be evenly spread in the circumferential direction, in the shown example embodiment concretely three absorber feet 24 being provided. As a matter of course, the vibration absorber ring 16 may also include a different number of absorber feet 24, especially four absorber feet 24.

Figure 8:
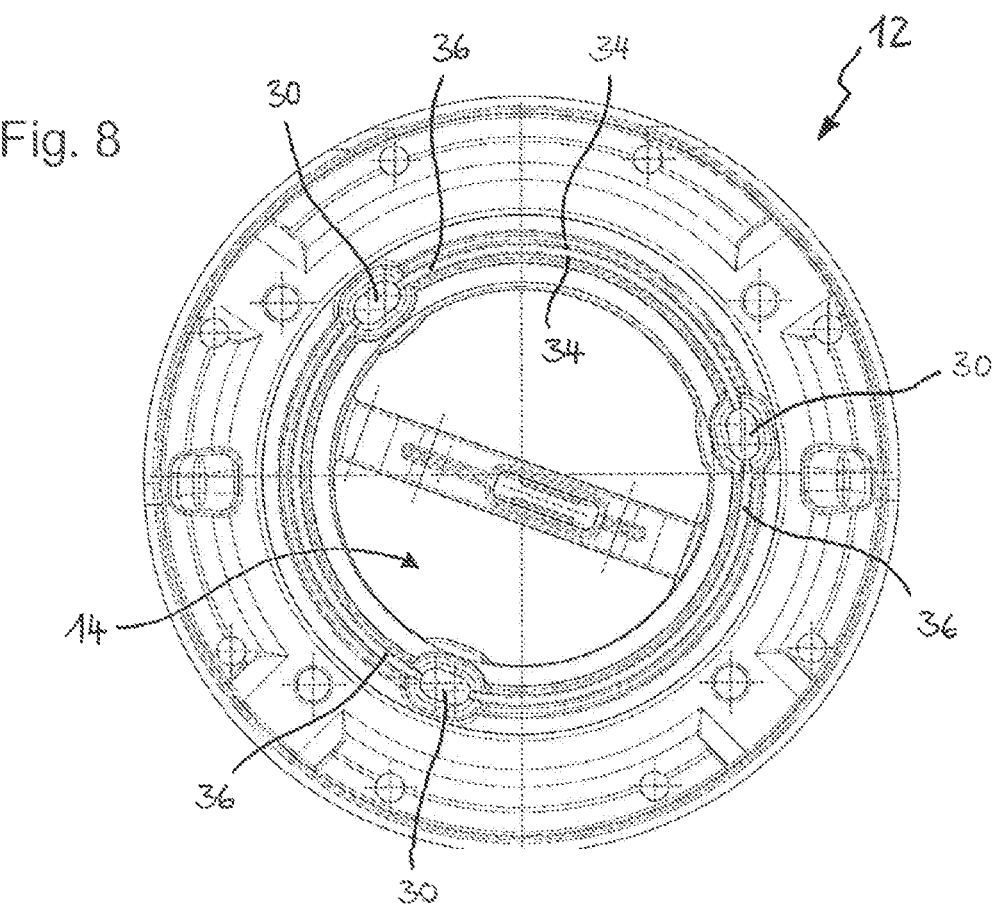
FIG. 8 shows an axial top view of a generator carrier of the airbag module according to FIG. 1.

Hereinafter, by way of the FIGS. 7 to 10, the assembly of the airbag module 10 will be briefly discussed, FIG. 7 showing a top view of the vibration absorber ring 16 and FIG. 8 showing a top view of the module base 12 in the form of a generator carrier.

Figure 9:
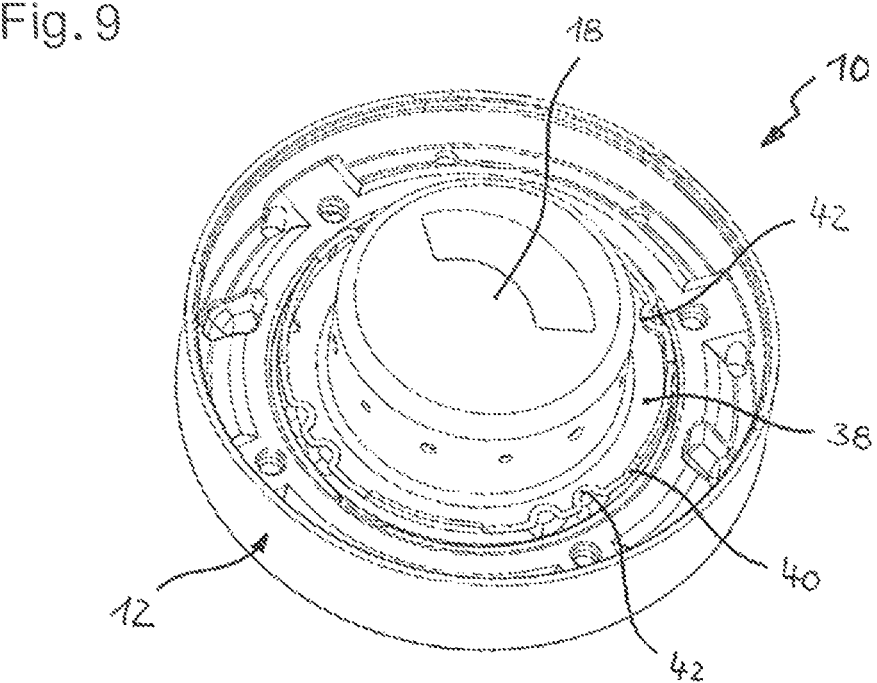
FIG. 9 shows a perspective top view of the airbag module according to FIG. 1 in a partly assembled condition.

Furthermore, a gas generator 18 shown in FIGS. 1 and 9 is provided, comprising a generator flange 38 peripherally closed in the circumferential direction which bears against the mounting flange 20 of the vibration absorber ring 16 in the axial direction. Especially both flanges 20, 38 extend around the ring axis A in a closed condition and fully bear against each other so that a substantially tight connection is formed. The gas generator 18 is tightly connected, for example locked, crimped, pressed, screwed, to the vibration absorber ring 16.

In the present example embodiment, the gas generator 18 is concretely fastened by means of a circumferential wall 40 which is integrally formed radially on the outside of the mounting flange 18 of the vibration absorber ring 16 and extends opposite to the absorber wall 22 in the axial direction (see also FIGS. 2 and 5).

According to FIG. 9, the gas generator 18 with its generator flange 38 was axially attached to the mounting flange 20 of the vibration absorber ring 16 such that the circumferential wall 40 is radially directly adjacent to and surrounds the generator flange 38. Subsequently, plural fastening portions 42 of the circumferential wall 40 spaced apart in the circumferential direction were deformed radially inwardly by an appropriate tool so that they radially overlap the generator flange 38 and preferably also fix the same axially against the mounting flange 20. Further, the mounting flange 20 also includes an anti-twist pin 44 which extends through a respective anti-twist opening within the generator flange 38 to fix the gas generator 18 in the circumferential direction relative to the vibration absorber ring 16 in a predetermined position. Thus, the gas generator 18 is permanently and tightly connected to the vibration absorber ring 16.

Figure 10:
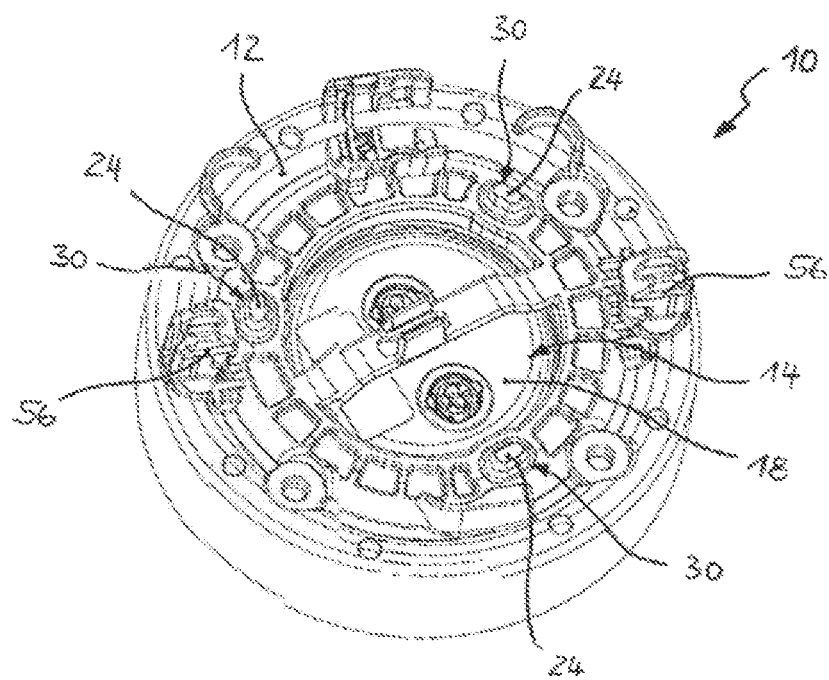
FIG. 10 shows a perspective bottom view of the partly assembled airbag module according to FIG. 9.

Subsequently, the subassembly of the gas generator 18 and the vibration absorber ring 16 is inserted into the module base 12, the free wall end 32 of the absorber wall 22 according to FIG. 3 engaging in the groove 36 and the absorber feet 24 according to FIG. 4 being attached to the fastening openings 30 of the module base 12 (cf. also FIG. 10).

After that, a module cover 46 is mounted, together with a folded airbag 48 and an airbag retaining plate 50, on the module base 12, the airbag retaining plate 50 being fastened, for example by screws 52 indicated in FIG. 3, to the module base 12 and, in so doing, clamping the module cover 46 as well as the airbag 48 via its airbag mouth 54 between the airbag retaining plate 50 and the module base 12.

Finally, the entire preassembled airbag module 10 can be fixed, especially locked, for example by hooks 56 integrally formed on the module base 12 (cf. FIGS. 1 and 10), to the steering wheel armature 8 of the vehicle steering wheel 6.

The invention claimed is:

1. An airbag module for a vehicle steering wheel, comprising:
    a module base (12) for fixed mounting on the vehicle steering wheel, the module base having a base opening (14), and
    a vibration absorber ring (16) for fastening a gas generator (18) to the module base (12) such that said gas generator can vibrate,
    wherein the vibration absorber ring (16) has a ring axis (A) and a mounting flange (20) for the gas generator (18),
    wherein the vibration absorber ring (16) has a resilient absorber wall (22), starting from the mounting flange (20), the absorber wall extends in an axial direction toward the module base (12) and extends around the ring axis (A) in a circumferential direction,
    wherein the vibration absorber ring (16) has a plurality of resilient absorber feet (24) for fastening to the module base (12), the plurality of absorber feet being formed from an elastomeric material and extending in the axial direction,
    wherein the module base (12) has a plurality of fastening openings (30) for receiving the plurality of absorber feet (24), an elastomeric portion of each absorber foot (24) extending through a corresponding one of the fastening openings (30), and wherein the vibration absorber ring (16) is fastened to the module base (12) by means of the absorber feet (24) such that, before activation of the airbag module (10), the absorber wall (22) bears against the module base (12), acts in an axial direction against the module base (12) and is resiliently deformed to substantially prevent gas from leaking out of the airbag module (10) from between the module base (12) and the absorber wall (22) upon activation of the airbag module (10).

2. The airbag module according to claim 1, wherein each of the absorber feet (24) form a detent connection or a snap-on connection with the module base (12).

3. The airbag module according to claim 1, wherein each of the absorber feet (24) includes a mounting portion (26) having a thickened outer cross-section and a peripheral absorber foot groove (28), wherein in the module base (12) fastening openings (30) are provided and an edge of each fastening opening (30) engages in the absorber foot groove (28) of an associated absorber foot (24).

4. The airbag module according to claim 1, wherein the absorber wall (22) includes a free axial wall end (32) adjacent to the module base (12), wherein a radial stop (34) is formed in the module base (12) radially adjacent to the free axial wall end (32).

5. The airbag module according to claim 1, wherein the absorber wall (22) has a free axial wall end (32) adjacent to the module base (12), wherein a groove (36) in which the free axial wall end (32) engages is formed in the module base (12).

6. The airbag module according to claim 1, wherein the absorber feet (24) are integrated in the peripheral absorber wall (22) in one piece.

7. The airbag module according to claim 1, wherein the plural absorber feet (24) are arranged to be evenly spread in the circumferential direction.

8. The airbag module according to claim 1, wherein the resilient absorber feet (24) at least in portions have a hollow cross-section in an axial direction.

9. The airbag module according to claim 1, wherein the vibration absorber ring (16) is a two-component part, comprising a resilient first component which forms the absorber wall (22) and the absorber feet (24) and comprising a second component which is less resilient than the first component.

10. The airbag module according to claim 1, wherein a gas generator (18) is provided, comprising a generator flange (38) which bears against the mounting flange (20) of the vibration absorber ring (16) in an axial direction, wherein the gas generator (18) is fixedly connected to the vibration absorber ring (16).

11. The airbag module according to claim 1, wherein the vibration absorber ring (16) includes three absorber feet (24) evenly spread in the circumferential direction.

12. The airbag module according to claim 1, wherein before activation of the airbag module (10), the airbag module (10) is free from gaps axially between the absorber wall (22) and the module base (12).

13. The airbag module according to claim 1, wherein the absorber wall (22) has a free axial wall end (32) that extends around the ring axis (A) in the circumferential direction and faces away from the mounting flange (20), the free axial wall end (32) directly engaging the module base (12) prior to activation of the airbag module (10).

14. The airbag module according to claim 13, wherein the module base has a groove (36) formed therein, the groove (36) being defined by an axial end wall that extends around the ring axis (A) in the circumferential direction and directly engages the free axial wall end (32).

15. The airbag module according to claim 14, wherein the groove (36) is further defined by inner and outer groove walls that extend around the ring axis (A) in the circumferential direction and are radially spaced from one another by the axial end wall of the groove (36), the absorber wall (22) including an inner circumferential wall facing the ring axis (A) in a radial direction and an opposite outer circumferential wall facing away from the ring axis (A) in the radial direction, and wherein
the inner circumferential wall of the absorber wall (22) directly engages the inner groove wall in the radial direction, and/or
the outer circumferential wall of the absorber wall (22) directly engages the outer groove wall in the radial direction.

16. The airbag module according to claim 1, wherein the module base has a groove (36) formed therein, the groove (36) being defined by inner and outer groove walls that extend around the ring axis (A) in the circumferential direction, the absorber wall (22) including an inner circumferential wall facing the ring axis (A) in a radial direction and an opposite outer circumferential wall facing away from the ring axis (A) in the radial direction, and wherein
the inner circumferential wall of the absorber wall (22) directly engages the inner groove wall in the radial direction, and/or
the outer circumferential wall of the absorber wall (22) directly engages the outer groove wall in the radial direction.

17. The airbag module according to claim 1, wherein the plurality of absorber feet (24) extend in the axial direction from the mounting flange (20) toward the module base (12).

18. An airbag module for a vehicle steering wheel, comprising:
a module base (12) for fixed mounting on the vehicle steering wheel, the module base having a base opening (14), and
a vibration absorber ring (16) for fastening a gas generator (18) to the module base (12) such that said gas generator can vibrate,
wherein the vibration absorber ring (16) has a ring axis (A) and a mounting flange (20) for the gas generator (18),
wherein the vibration absorber ring (16) has a resilient absorber wall (22), the absorber wall extending in an axial direction starting from the mounting flange (20) toward the module base (12) and extending around the ring axis (A) in a circumferential direction, the absorber wall (22) having a free axial wall end (32) that is adjacent to the module base (12) and engages in a groove (36) formed in the module base (12),
wherein the vibration absorber ring (16) has a plurality of resilient absorber feet (24) for fastening to the module base (12), the plurality of absorber feet extending in the axial direction, and
wherein the vibration absorber ring (16) is fastened to the module base (12) by means of the absorber feet (24) such that, before activation of the airbag module (10), the absorber wall (22) bears against the module base (12), acts in an axial direction against the module base (12) and is resiliently deformed to substantially prevent gas from leaking out of the airbag module (10) from between the module base (12) and the absorber wall (22) upon activation of the airbag module (10).

19. An airbag module for a vehicle steering wheel, comprising:
- a module base (12) for fixed mounting on the vehicle steering wheel, the module base having a radial stop (34) and a base opening (14), and
- a vibration absorber ring (16) for fastening a gas generator (18) to the module base (12) such that said gas generator can vibrate,
- wherein the vibration absorber ring (16) has a ring axis (A) and a mounting flange (20) for the gas generator (18),
- wherein the vibration absorber ring (16) has a resilient absorber wall (22), starting from the mounting flange (20), the absorber wall extends in an axial direction toward the module base (12) and extends around the ring axis (A) in a circumferential direction, the absorber wall (22) including a free axial wall end (32) adjacent to the module base (12), the radial stop (34) being formed in the module base (12) radially adjacent to the free axial wall end (32),
- and wherein the vibration absorber ring (16) has a plurality of resilient absorber feet (24) for fastening to the module base (12), the plurality of absorber feet extending in the axial direction,
- wherein the vibration absorber ring (16) is fastened to the module base (12) by means of the absorber feet (24) such that, before activation of the airbag module (10), the absorber wall (22) bears against the module base (12), acts in an axial direction against the module base (12) and is resiliently deformed to substantially prevent gas from leaking out of the airbag module (10) from between the module base (12) and the absorber wall (22) upon activation of the airbag module (10).

* * * * *